(12) United States Patent
Scherer

(10) Patent No.: US 10,441,964 B2
(45) Date of Patent: Oct. 15, 2019

(54) DEVICE FOR DISPENSING A PLURALITY OF FLUID PRODUCTS

(71) Applicant: ALBEA SERVICES, Gennevilliers (FR)

(72) Inventor: Christopher Scherer, Orange, CT (US)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 15/656,823

(22) Filed: Jul. 21, 2017

(65) Prior Publication Data

US 2019/0022682 A1   Jan. 24, 2019

(51) Int. Cl.
*B05B 11/00* (2006.01)
*G05D 11/03* (2006.01)

(52) U.S. Cl.
CPC ...... *B05B 11/3083* (2013.01); *B05B 11/0054* (2013.01); *B05B 11/0078* (2013.01); *B05B 11/3066* (2013.01); *B05B 11/3067* (2013.01); *G05D 11/03* (2013.01); *B05B 11/3001* (2013.01); *B05B 11/3047* (2013.01)

(58) Field of Classification Search
CPC ............. B05B 11/3083; B05B 11/0078; B05B 11/3066; B05B 11/3001
See application file for complete search history.

(56) References Cited

U.S. PATENT DOCUMENTS

| 6,220,483 | B1* | 4/2001 | van der Heijden ................. B05B 11/3085 222/136 |
| 6,464,107 | B1* | 10/2002 | Brugger .............. B05B 11/3056 222/134 |
| 2001/0025859 | A1* | 10/2001 | Dumont .................. B05B 15/30 222/136 |
| 2015/0102061 | A1* | 4/2015 | Larson ................ B05B 11/0081 222/129 |

* cited by examiner

*Primary Examiner* — Donnell A Long
(74) *Attorney, Agent, or Firm* — Steven M. Greenberg, Esq.; Shutts & Bowen LLP

(57) ABSTRACT

A device for dispensing fluid products includes one or more containers, each storing one fluid product, a unique pump provided with a dosage chamber enclosing a dose of mixture of the fluid products, and including an actuating member, and a manifold associating the pump to the containers for dispensing the fluid products. The manifold includes one or more hollow tubes each extending into a container and forming a channel for the flow of the fluid product from the container towards the pump. As well, the tubes of the manifold are rigid and at least one tube of the manifold includes means for regulating the volumetric ratio of the fluid product flow, these regulating means being integrated inside the rigid tube.

14 Claims, 3 Drawing Sheets

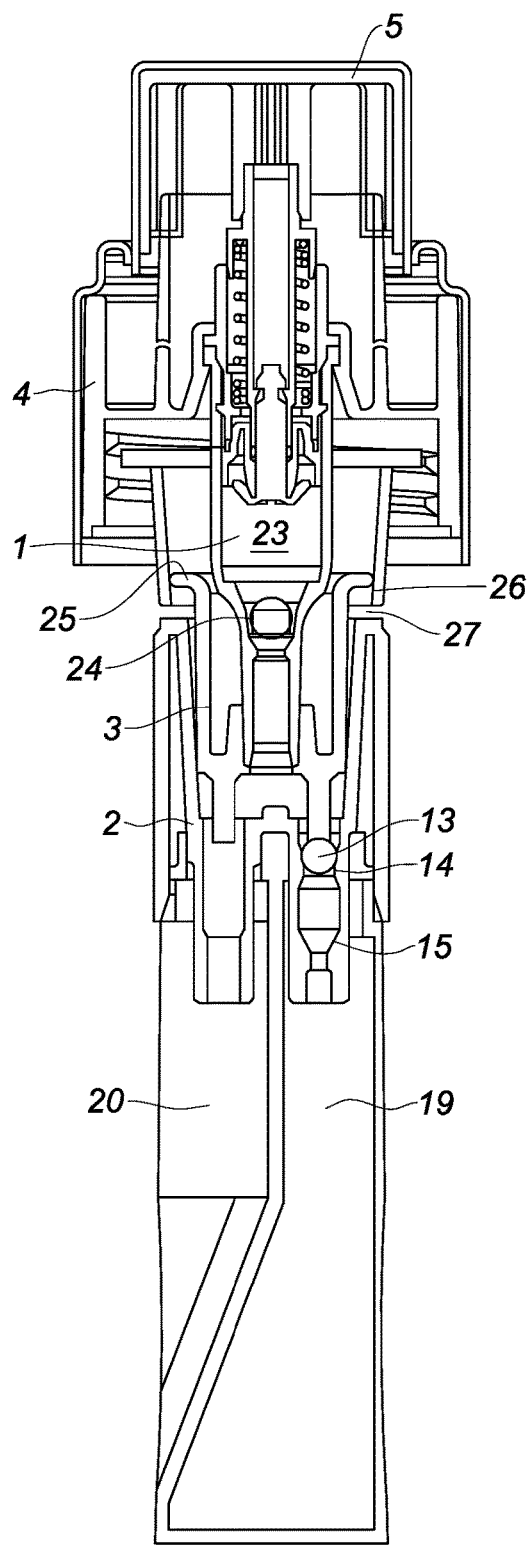
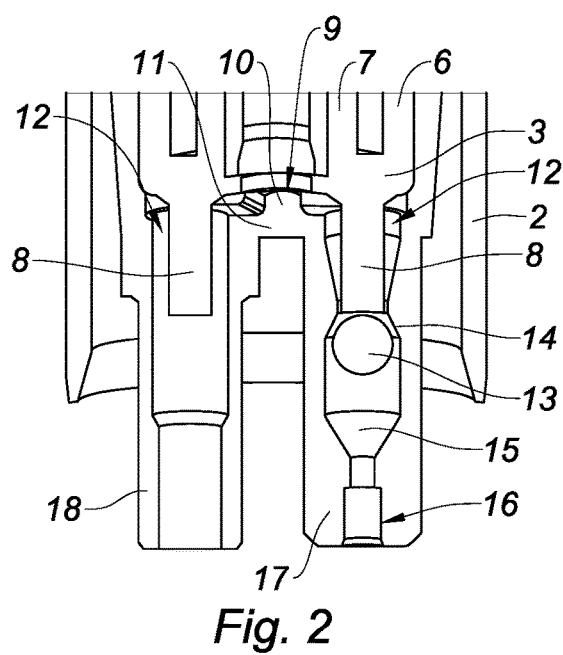
Fig. 1
Fig. 2

DEVICE FOR DISPENSING A PLURALITY OF FLUID PRODUCTS

BACKGROUND OF THE INVENTION

Field of the Invention

The invention relates to a device for dispensing a plurality of fluid products. The fluid products can be for example liquid, or foamy, or viscous. The invention also concerns a bottle for dispensing said fluid products, comprising such a dispensing device. And finally, the invention deals with a process for assembling such a bottle.

Description of the Related Art

Various devices are known in the art to dispense fluids. Typically, dispensers hold a single fluid. However, it is often desirable for multiple fluids to be stored in separate storage containers within a single device, and then mixed and immediately dispensed as a mixture from the device. These devices are rather voluminous, as they integrate as many pumps as the number of containers, even if there is only one actuating member.

In order to reduce the size of the device, it is known to use a unique pump for a plurality of containers, with a manifold system that links the pump and the containers by means of flexible tubes.

In various industries, including the cosmetic industry and pharmaceutic industry, it is desirable to have a device that is configured to proportionally adjust the volumetric ratio of each fluid that makes up the mixture, in order to provide a customized product that includes each of a plurality of fluids. However, the volumetric ratio is difficult to control when there is only one pump for sucking up several fluids, as there is only one dosage chamber.

To solve this problem, it is known to provide adjustment members that act on the constriction of the flexible tubes of the manifold to selectively control the amount of fluid flowing through each tubes. The disadvantage is that these flexible tubes are not strong enough in the long term, and in that the adjustment members do not provide the same flow constriction at the beginning and at the end of the pack, i.e. when the containers are empty. The volumetric ratio derives over time. Moreover, with this kind of adjustment members, it is not possible to control the volumetric ratio from a quantitative point of view, as it depends on the flexible material of the tube, on the section of the tube, on the wear of the tubes, and on the setting of the adjustment members

BRIEF SUMMARY OF THE INVENTION

The object of the invention is to propose a device for dispensing a plurality of fluid products, that is compact, and where the volumetric ratio is controlled efficiently and without any derive over time. The present invention solves the above technical problem with a device for dispensing a plurality of fluid products, comprising:
- a plurality of containers, each container storing one fluid product;
- a unique pump provided with a dosage chamber enclosing a dose of mixture of the fluid products, and comprising an actuating member;
- a manifold associating the pump to the plurality of containers for dispensing the fluid products, said manifold comprising a plurality of hollow tubes, each tube extending into a container and forming a channel for the flow of the fluid product from the container towards the pump.

This dispensing device is characterized in that the tubes of the manifold are rigid and at least one tube of the manifold comprises means for regulating the volumetric ratio of the fluid product flow, these regulating means being integrated inside the rigid tube.

One core idea of the invention is to provide a manifold with rigid tubes that are strong over time, and that do not deform, so as to control efficiently the volumetric ratio. Moreover, the means for regulating the ratio of the fluid product inlet flow are no longer located outside the tubes, but inside the tubes, so as to free space and provide a more compact dispensing device. With such a manifold, it is possible to use existing pumps, which reduces the conception costs.

According to different embodiments, that can be taken together or separately:
- the dispensing device further comprises a purge bushing located into the manifold and receiving the pump: this purge bushing is a linkage between the manifold and the pump. Moreover, the purge bushing fills up the free space between the manifold and the pump so as to limit the dead volume and to limit the air volume to be purged during a boot routine by actuating the pump several times at the first use of the device.
- the tube comprises an inlet valve comprising two successive seats consisting each of a narrowing of the internal diameter of the tube, the first seat being directed to the pump and forming a first inlet orifice adapted to be closed by a ball to seal the container before the first use of the device, and the second seat being directed to the free end of the tube and forming a second inlet orifice adapted to be open or closed by said ball when the device is unseal and ready for use: this valve has two functions (a) sealing the corresponding container before the first use of the device and (b) opening/closing the valve when the device is ready for use. This valve enables to delay the dispensing of the fluid product stored in the corresponding container. Depending on the final mixture wanted, it may be preferable for a fluid product to arrive before or after another fluid product.
- the inlet valve is located downstream the means for regulating.
- said purge bushing comprises at least one leg adapted to abut and push on the ball of said inlet valve to unseal it: the purge bushing is then used to break the tightness of the container, like a breaking of a lid foil. The advantage is that, with such a solution, there is no lid foil that falls into the container and that may pollute the fluid product.
- said means for regulating the volumetric ratio of the fluid product flow consists of a narrowing of the internal diameter of the tube, integrally formed within the tube: contrary to a constriction of a flexible tube, the proposed solution enables to decrease sustainably the flow section directly inside the tube. As the narrowed portion is created in the mass of the tube, there cannot be any deformation of the tube and any derive of the volumetric ratio over time. This narrowed portion creates a stable pressure loss, and is defined thanks to test campaigns for a desired fluid product. The volumetric ratio is thus clearly controlled. It is possible to have a set of manifolds with different sizes of narrowed portion.
- the volumetric ratio of the fluid product flow is preferably between 1 and 30: that means that the flow of a first fluid product can be 30 times greater than the flow of a second fluid product.
- the internal diameter of the tube in the narrowed portion varies between 2.5 mm and 0.4 mm.
- the ratio between the diameter of a tube without narrowed portion and the diameter of a tube with a narrowed portion is between 2 and 4 for a volumetric ratio of the fluid product flow between 1.5 and 10: for example, the diameter of the tube without narrowed portion is 2.5 mm and the diameter of the tube with a narrowed portion is 0.75 mm.

the ratio between the diameter of a tube without narrowed portion and the diameter of a tube with a narrowed portion is between 4 and 10 for a volumetric ratio of the fluid product flow between 10 and 50: for example, the diameter of the tube without narrowed portion is 2.5 mm and the diameter of the tube with a narrowed portion is 0.4 mm.

the means for regulating the volumetric ratio of the fluid product flow consists of a groove on the surface of the ball of the inlet valve so as to create a controlled leakage through the inlet valve.

the purge bushing is made of polyethylene.

the manifold is made of polypropylene.

the manifold comprises an upper part for its interlocking with the subset composed of the purge bushing and the pump, and a lower part corresponding to the tubes in relation with the containers, a radial plate extending between both parts and comprising:

a plurality of holes, each hole corresponding to a channel outlet from a tube inserted into the container;

an axial protrusion extending towards the upper part, the purge bushing abutting on this protrusion when the device is ready for use.

the purge bushing is provided with:

an external skirt adapted to contact the internal surface of the upper part of the manifold and to rest on the axial protrusion of the manifold;

an internal skirt wherein the pump is tight fitted;

at least one leg extending into a tube of the manifold;

a central orifice at the bottom of the internal skirt.

the central orifice of the purge bushing defines an intermediate area downstream the tubes and upstream the pump, wherein said fluid products mix: the fluid products enter into contact each other just before their introduction into the pump. They are however not completely mixed in order to enable the user to see each product when a dose is dispensed. The user appreciates having the proof of the presence of all the fluid products.

the fluid products enter into contact each other into the dosage chamber of the pump: in this case, the tubes of the manifold lead directly into the dosage chamber.

the pump is provided with a valve upstream the dosage chamber.

the pump is provided with a tubular end adapted to be inserted into said internal skirt of the purge bushing.

The invention also relates to a bottle for dispensing fluid products comprising a tank for storing said products and a dispensing device as described previously, said dispensing device being provided with a sleeve adapted to be mounted on a neck of said tank, the body of the pump being inserted into said sleeve. By depressing the actuating member of the pump, a dose of fluid products is dispensed.

More preferably, the dispensing device comprises a first container sealingly closed and storing a first fluid product of the serum type, and a second container in flow communication with the tank storing both a second fluid product of the lotion type. The first container is smaller than the combination of the second container and the tank. A small amount of serum is generally mixed to a big amount of lotion.

Finally, the invention concerns an assembling process of a bottle for dispensing fluid products as described above, wherein it comprises the following steps:

inserting the dispensing device into the tank, the purge bushing being in a first position so as to seal the containers having an inlet valve;

interlocking the sleeve on a neck of said tank so as to lock the dispensing device in the tank and generate an axial displacement of the subassembly composed of the sleeve, the pump and the purge bushing, in relation to the subassembly composed of the manifold, the containers and the tank, the purge pushing being displaced in a second position so as to unseal the containers having an inlet valve.

When interlocking the sleeve of the tank, by snap-fitting or screwing, the purge bushing axially moves from a first position where its legs are resting on the ball of the inlet valves positioned on the first seat, to a second position where its legs are pushing the ball through the first inlet orifice so as to move the ball to the second seat of the inlet valves.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a cross-sectional view of an embodiment of the dispensing device according to the invention, the ball of the inlet valve sealing the corresponding container;

FIG. 2 is a detailed view on a part of the manifold of the dispensing device with the ball of the inlet valve unsealing the corresponding container;

DETAILED DESCRIPTION OF THE INVENTION

FIG. 1 illustrates a possible embodiment of a dispensing device according to the invention. This dispensing device is in a shipping position.

Figure 3:
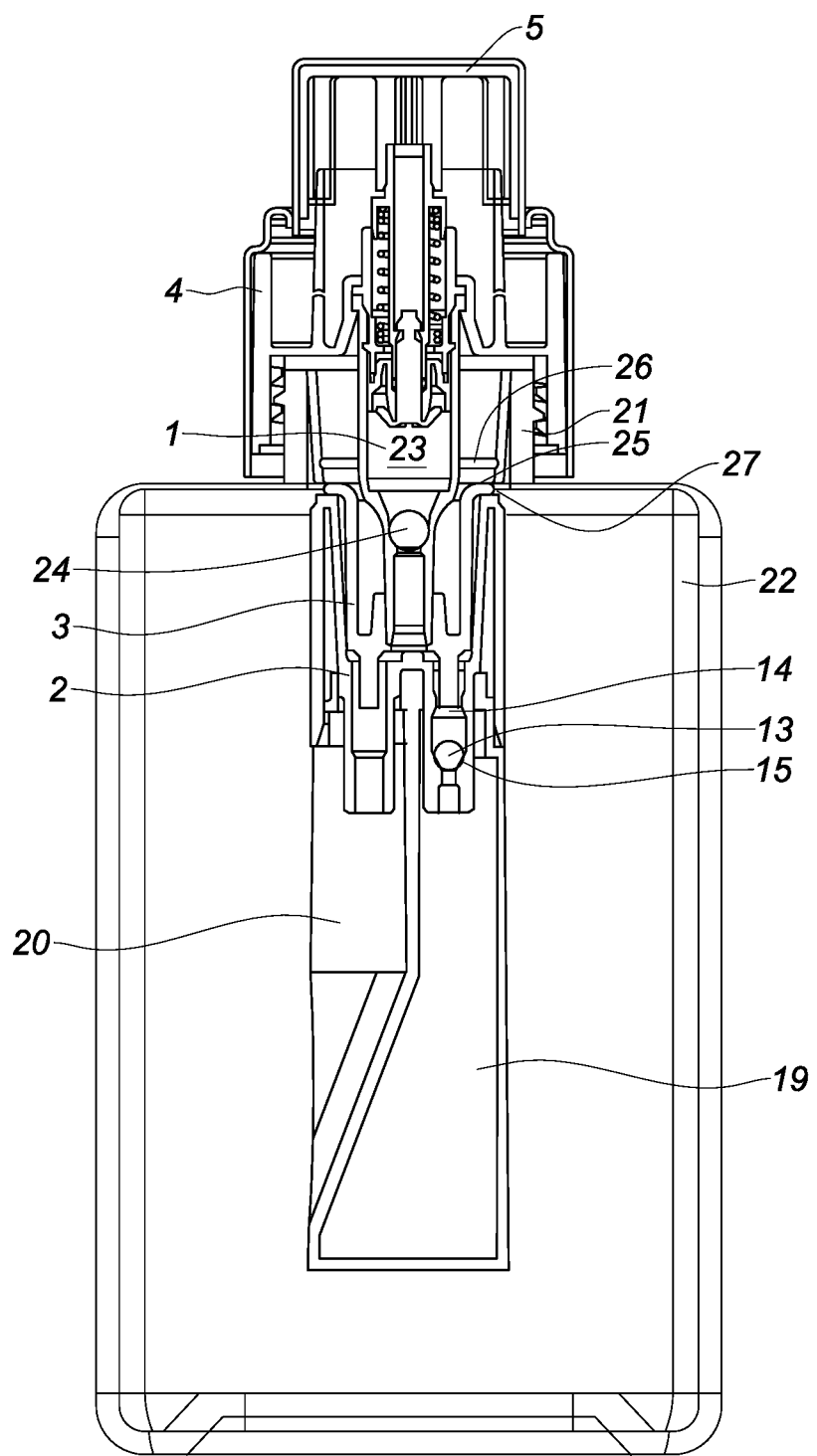
FIG. 3 is a cross-sectional view of a bottle equipped with the dispensing device according to the invention.

This dispensing device comprises a sleeve 4 adapted to be mounted on the neck 21 of a tank 22 of a bottle as depicted in FIG. 3, in this case by screwing, thanks to the threads located inside the sleeve 4 and outside the neck 21.

A pump 1 is inserted into the sleeve 4, and is provided with an actuating member 5, i.e. a push button, that extends upwardly from the sleeve 4. The pump 1 can be a standard pump 1, with a piston, a spring for returning the actuating member 5 to its initial position, a dosage chamber 23, and a valve 24.

The pump 1 is linked to a plurality of containers 19,20 by means of a manifold 2. Each container 19,20 stores a different fluid product.

As better depicted in FIG. 2, the manifold 2 comprises an upper part for its interlocking with the pump 1, and a lower part consisting of a plurality of hollow tubes 17,18, each tube extending into a container 19,20 and forming a channel for the fluid product flow from the container 19,20 towards the pump 1.

The manifold 2 is made of a rigid material, and the tubes 17,18 are therefore also rigid.

According to desired final mixture of the fluid products to be dispensed, it may be necessary to control the volumetric ratio of each fluid product flowing to the dosage chamber 23 of the pump 1. In order to keep a compact device, means for regulating this volumetric ratio are directly integrated into the rigid tubes 17,18, and not outside the tubes 17,18 as it was the case in the state of art.

In the example shown in FIGS. 1-3, these means for regulating the ratio of the fluid product inlet flow consists of a narrowing of the internal diameter of the tube 17, integrally formed within the tube 17. That means that the thickness of the tube 17 is increased.

Depending on the desired volumetric ratio, there can be different sizes of narrowed portion 16 of the tube 17.

For example, it is common to dispense two fluid products consisting of a lotion stored in a first container 20 and a serum stored in a second container 19. The lotion, that is cheap, is the base of the final mixture, and the serum, that is expensive, is the additive of the final mixture. Usually, the lotion is in greater quantity than the serum. The following table gives indications about the possible desired volumetric ratios and the corresponding sizes of the tubes 17,18:

| Volumetric ratio | Diameter (mm) of the tube 18 sucking up lotion | Diameter (mm) of the narrowed portion 16 of the tube 17 sucking up serum |
| --- | --- | --- |
| 1 to 1 | 2.5 | 2.5 |
| 1 to 2 | 2.5 | 0.75 |
| 1 to 30 | 2.5 | 0.4 |

In this case, the internal diameter is identical all along the length of the tube 18 sucking up the lotion, whatever the volumetric ratio is. This internal diameter is a reference.

The tube 17 sucking up the serum is provided with a narrowed portion 16 whose internal diameter varies in relation with the reference and according to the desired volumetric ratio.

In other examples, it is possible to have more than two containers 19,20. It is also possible for each tube 17,18 to be provided with a narrowed portion 16.

Each tube 17,18 can be provided with an inlet valve. This valve comprises two successive seats consisting each of a narrowing of the internal diameter of the tube 17,18.

In this embodiment, the first seat 14 is directed to the pump 1 and forms a first inlet orifice adapted to be closed by a ball 13 to seal the container 19 before the first use of the device, as depicted in FIG. 1. The second seat 15 is directed to the free end of the tube 17 and forms a second inlet orifice adapted to be open or closed by said ball 13 when the device is unsealed and ready for use, as depicted in FIG. 3. The working of this valve will be described more accurately further in the description.

In this embodiment, the tube 18 linked to the first container 20 storing lotion does not have any valve as the lotion is a product that does not need to be highly protected. On the contrary, the tube 17 linked to the second container 19 storing the serum is provided with such an inlet valve located downstream the narrowed portion 16. The serum is indeed a fragile product that needs to be protected from the air.

Instead of narrowing the internal diameter of the tube, another solution to control the volumetric ratio is to dig a groove on the surface of the ball 13 of the inlet valve so that a controlled leakage is created through the valve for the desired ratio. This alternative solution is not depicted here.

The dispensing device further comprises a purge bushing 3 located into the manifold 2 and receiving the pump 1. This purge bushing 3 fulfills many functions:
 supporting the pump 1 and positioning the pump 1 in relation with the manifold 2;
 filling up the free space between the manifold 2 and the pump 1 so as to limit the dead volume and to limit the air volume to be purged;
 unsealing the containers 19,20 before the first use of the device.

Preferably, the manifold 2 comprises an upper part for its interlocking with the subset composed of the purge bushing 3 and the pump 1, and a lower part corresponding to the tubes 17,18 in relation with the containers 19,20. The manifold 2 is also provided with a radial plate 11 extending between both parts and comprising:
 a plurality of holes 12, each hole 12 corresponding to a channel outlet from a tube 17,18 inserted into the container 19,20;
 an axial protrusion 10 extending towards the upper part, the purge bushing 3 abutting on this protrusion 10 when the device is ready for use.

Preferably, the purge bushing 3 is provided with:
 an external skirt 6 adapted to be in contact with the internal surface of the upper part of the manifold 2 and to rest on the axial protrusion 10 of the manifold 2;
 an internal skirt 7 wherein a tubular end of the pump 1 is tight fitted;
 a plurality of legs 8, each leg 8 extending into a tube 17,18 of the manifold 2;
 a central orifice 9 at the bottom of the internal skirt 7 and through which enters the fluid products from the different tubes 17,18.

The internal 7 and external 6 skirts enable to position and maintain the pump 1 relative to the manifold 2.

The skirts 6,7 and the legs 8 enable to fill the free space between the pump 1 and the manifold 2.

And finally, the legs 8 enable to unseal the corresponding containers 19,20. More precisely, the legs 8 are designed so that their free end can come into contact with the ball 13 of the inlet valves when the ball 13 abuts against the first seat 14 for sealing the container 19,20.

The purge bushing 3 is mounted into the manifold 2 and is axially moveable between two stable positions.

Figure 6:
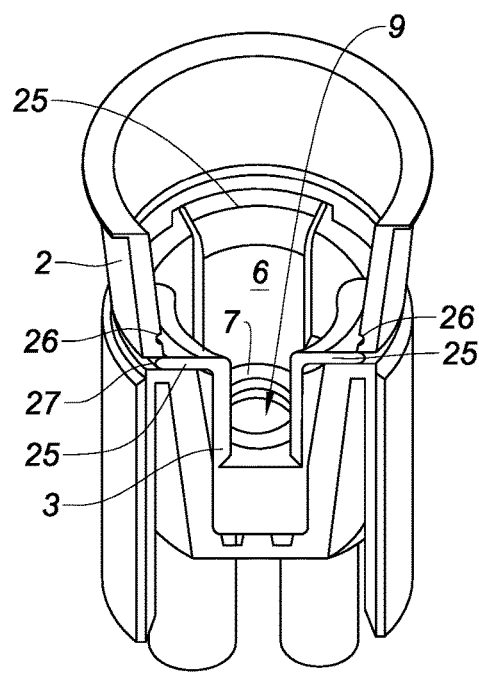
FIG. 6 is a perspective and cross-sectional view of the purge bushing mounted into the manifold.

More precisely, the free end of the external skirt 6 of the purge bushing 3 is provided with a peripheral edge 25 (see FIG. 4), whereas the internal wall of the upper part of the manifold 2 is provided with a peripheral upper groove 26 and a peripheral lower groove 27 (see FIGS. 1, 3, 6).

The edge 25 of the purge bushing 3 is adapted to be inserted into these grooves 26,27, as explained further in the description.

When the device is in a shipping position, as in FIG. 1, the edge 25 of the purge bushing 3 is inserted into the upper groove 26 of the manifold 2, and the ball 13 is blocked into the first seat 14 of the inlet valve. The legs 8 of the purge bushing 3 are slightly inserted into the tubes 17,18 of the manifold 2. One leg 8 is in contact with the ball 13 of the inlet valve, and exerts a little pressure on it. The ball 13 close the inlet orifice so as to seal the container 19 located upstream.

When mounting the device on the neck 21 of a tank 22 as depicted in FIG. 3, the first subassembly composed of the sleeve 4, the pump 1 and the purge bushing 3 moves axially in relation to the second subassembly composed of the manifold 2, the containers 19,20 and the tank 22. This axial movement is limited by the contact between the protrusion 10 of the manifold 2 and the bottom of the internal skirt 7 of the purge bushing 3. The force exerted on the first subassembly is sufficient to axially move the purge bushing 3 so that its edge 25 moves downwards from the upper groove 26 to the lower groove 27 of the manifold 2, as depicted in FIG. 6. By this axial movement of the purge bushing 3, the force exerted on the ball 13 by the leg 8 is sufficient to enable the ball 13 to pass through the first inlet orifice of the first seat 14 as depicted in FIG. 2. This first inlet orifice is sized so that the diameter of the orifice is a little bit smaller than the diameter of the ball 13. But under the force exerted on the ball 13, the latter can pass through the first inlet orifice. The container 19 is thus unsealed.

By gravity, the ball 13 falls on the second seat 15 of the inlet valve so as to close it. The dispensing device is then ready for use, as depicted in FIG. 3.

For sucking up the fluid products, a flexible dip tube (not illustrated) is usually inserted at the free end of each rigid tube so as to plunge into the container, and reach the bottom of the container.

In this embodiment, the serum is stored in the second container 19 that is sealingly closed, whereas the lotion is stored in the first container 20 in flow communication with the tank 22 so as to increase the storage capacity for the lotion.

In other examples, it is possible to have two sealingly closed containers 19,20, with a tank 22 fitted to both containers 19,20.

To the contrary, it would also be possible to have both containers 19,20 in flow communication with the tank 22, the latter being divided into two parts in order to separate the fluid products.

In this embodiment, the purge bushing 3 defines an intermediate area downstream the tubes 17,18 and upstream the pump 1, wherein said fluid products mix.

It would also be possible to provide an arrangement where the rigid tubes 17,18 lead directly into the dosage chamber 23 of the pump 1 in order to be mixed directly into the pump 1.

Figure 4:
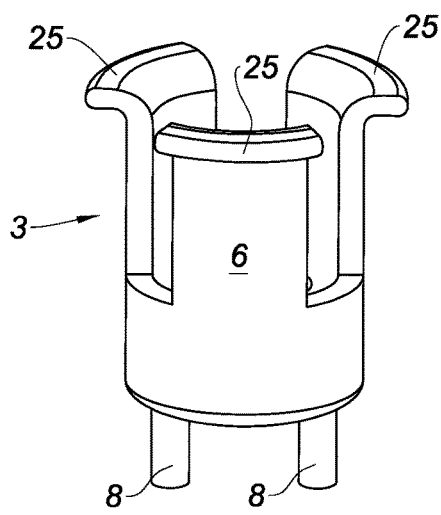
FIG. 4 is a perspective view of the purge bushing.
Figure 5:
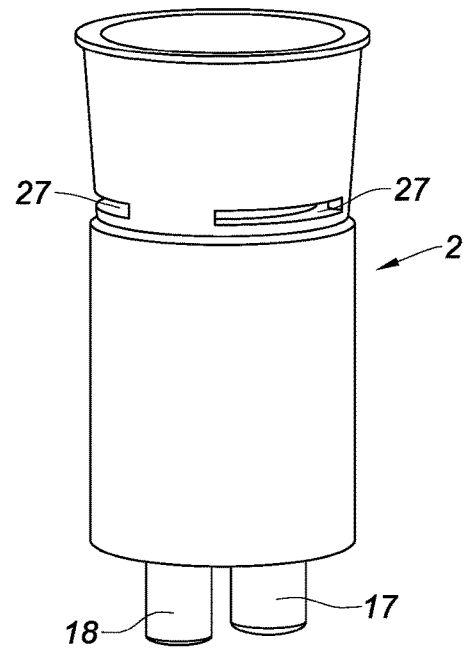
FIG. 5 is a perspective view of the manifold.

Advantageously, the external skirt 6 of the purge bushing 3 is divided into three radial parts, forming thus three parts of edge 25 at its free end (see FIG. 4). In the same way, the lower groove 27 of the manifold 2 is interrupted so as to form three parts of groove 27. Preferably, these three parts of groove 27 form three through holes (see FIG. 5). Each part of edge 25 is adapted to be mounted into a part of groove 27 when the device is mounted into the tank 22 (see FIG. 6).

Although the dispensing device of the invention has been described above by reference to a specific embodiment shown in the drawing figures, it should be understood that modifications and variations could be made without departing from the intended scope of the following claims.

Having thus described the invention of the present application in detail and by reference to embodiments thereof, it will be apparent that modifications and variations are possible without departing from the scope of the invention defined in the appended claims as follows.

I claim:

1. A device for dispensing a plurality of fluid products, comprising:
   a plurality of containers, each container storing one fluid product;
   a unique pump provided with a dosage chamber enclosing a dose of mixture of the fluid products, and comprising an actuating member;
   a manifold associating the pump to the plurality of containers for dispensing the fluid products, said manifold comprising a plurality of hollow tubes, each tube extending into a container and forming a channel for the flow of the fluid product from the container towards the pump;
   characterized in that the tubes of the manifold are rigid and at least one of the tubes is a regulation tube that comprises means for regulating the volumetric ratio of the fluid product flow, these regulating means being integrated inside the regulation tube.

2. The device as in claim 1, wherein the device further comprises a purge bushing located into the manifold and receiving the pump.

3. The device as in claim 2, wherein the manifold comprises an upper part for its interlocking with the subset composed of the purge bushing and the pump, and a lower part corresponding to the tubes in relation with the containers, a radial plate extending between both parts and comprising:
   a plurality of holes, each hole corresponding to a channel outlet from one of the tubes inserted into one of the containers;
   an axial protrusion extending towards the upper part, the purge bushing abutting on this protrusion when the device is ready for use.

4. The device as in claim 3, wherein the purge bushing is provided with:
   an external skirt adapted to be in contact with the internal surface of the upper part of the manifold and to rest on the axial protrusion of the manifold;
   an internal skirt wherein the pump is tight fitted;
   at least one leg extending into one of the tubes of the manifold;
   a central orifice at a bottom of the internal skirt.

5. The device as in claim 4, wherein the central orifice of the purge bushing defines an intermediate area that is in between the tubes and the pump, wherein said fluid products mix.

6. The device as in claim 1, wherein the regulation tube comprises an inlet valve comprising two successive seats consisting each of a narrowing of the internal diameter of the regulation tube, the first seat being directed to the pump and forming a first inlet orifice adapted to be closed by a ball to seal the container before the first use of the device, and the second seat being directed to the free end of the regulation tube and forming a second inlet orifice adapted to be open or closed by said ball when the device is unsealed and ready for use.

7. The device as in claim 6, wherein said purge bushing comprises at least one leg adapted to abut and push on the ball of said inlet valve to unseal it.

8. The device as in claim 6, wherein the means for regulating the volumetric ratio of the fluid product flow consists of a groove on the surface of the ball of the inlet valve so as to create a controlled leakage through the inlet valve.

9. The device as in claim 1, wherein said means for regulating the volumetric ratio of the fluid product flow consists of a narrowed portion of the internal diameter of the regulation tube, integrally formed within the regulation tube.

10. The device as in claim 9, wherein the ratio between the diameter of the tube without narrowed portion and the diameter of the regulation tube with a narrowed portion is between 2 and 4 for a volumetric ratio of the fluid product flow between 1.5 and 10.

11. The device as in claim 9, wherein the ratio between the diameter of the tube without narrowed portion and the diameter of the regulation tube with a narrowed portion is between 4 and 10 for a volumetric ratio of the fluid product flow between 10 and 50.

12. The device as in claim 1, wherein the volumetric ratio of the fluid product flow is between 1 and 30.

13. The device as in claim 1, wherein the internal diameter of the regulation tube in the narrowed portion varies between 2.5 mm and 0.4 mm.

14. A method of assembling a bottle for dispensing fluid products, the method comprising the steps of:

inserting a dispensing device into a tank, the dispensing device comprising:

a plurality of containers, each container storing one fluid product, at least one of the containers having an inlet valve;

a unique pump provided with a dosage chamber enclosing a dose of mixture of the fluid products, and comprising an actuating member;

a manifold associating the pump to the plurality of containers for dispensing the fluid products, said manifold comprising a plurality of hollow tubes, each tube extending into a container and forming a channel for the flow of the fluid product from the container towards the pump; and, a sleeve;

a purge bushing located in the manifold and receiving the pump;

characterized in that the tubes of the manifold are rigid and at least one tube of the manifold comprises means for regulating the volumetric ratio of the fluid product flow, these regulating means being integrated inside the rigid tube, wherein during the inserting, the purge bushing is in a first position so as to seal the containers having an inlet valve; and, interlocking the sleeve on a neck of said tank so as to lock the dispensing device in the tank and generate an axial displacement of the subassembly composed of the sleeve, the pump and the purge bushing, in relation to the subassembly composed of the manifold, the containers and the tank, the purge bushing being displaced in a second position so as to unseal the containers having an inlet valve.

\* \* \* \* \*